United States Patent
Molinari et al.

(10) Patent No.: US 10,968,406 B2
(45) Date of Patent: Apr. 6, 2021

(54) APPARATUS AND PROCESS FOR THE HYDROCONVERSION OF HEAVY OIL PRODUCTS

(71) Applicant: ENI S.P.A., Rome (IT)

(72) Inventors: Mario Molinari, San Donato Milanese (IT); Susi Bonomi, Milan (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 16/337,171

(22) PCT Filed: Oct. 26, 2017

(86) PCT No.: PCT/IB2017/056646
§ 371 (c)(1),
(2) Date: Mar. 27, 2019

(87) PCT Pub. No.: WO2018/078555
PCT Pub. Date: May 3, 2018

(65) Prior Publication Data
US 2019/0241820 A1    Aug. 8, 2019

(30) Foreign Application Priority Data
Oct. 28, 2016   (IT) .................... 102016000109063

(51) Int. Cl.
*C10G 65/12* (2006.01)
*B01D 3/16* (2006.01)
(Continued)

(52) U.S. Cl.
CPC ............... *C10G 65/12* (2013.01); *B01J 8/22* (2013.01); *B01L 3/16* (2013.01); *C10G 45/00* (2013.01);
(Continued)

(58) Field of Classification Search
None
See application file for complete search history.

(56) References Cited

U.S. PATENT DOCUMENTS 3,296,240 A * 1/1967 MacDonald ............. C08F 6/12
528/500
3,372,677 A   3/1968 Boyen
(Continued)

FOREIGN PATENT DOCUMENTS

WO   2016/102302 A1   7/2015
WO   2016/103199 A1   6/2016

OTHER PUBLICATIONS

International Search Report and Written Opinion for PCT/IB2017/056646 dated Jan. 17, 2018, 11 pages.
(Continued)

*Primary Examiner* — Tam M Nguyen
(74) *Attorney, Agent, or Firm* — Husch Blackwell LLP (57) ABSTRACT

The present invention relates to an apparatus for the hydroconversion of heavy oil products (the fresh load). Said apparatus comprises: a slurry bubble column hydroconversion reactor, which comprises a feed line in which the fresh load and the recirculated slurry phase are conveyed, an inlet line for a hydrogenating stream and an outlet for a reaction effluent through an outlet nozzle; a stripping column at high pressure and high temperature placed downstream of the reactor and directly connected to the reactor head through a pipeline in which the reaction effluent flows; said column having an inlet line for a stripping gas, an inlet for the reactor effluent, a head outlet for steam and an outlet for the slurry phase; lines and means for recirculating the slurry leaving the stripping column; lines and means for taking a drain stream, which has the function of preventing the accumulation of solids in the reactor. The stripping column is
(Continued)

characterized in that it contains one or more contact devices that allow physical contact to be created between different phases.

20 Claims, 5 Drawing Sheets

(51) Int. Cl.
    *B01J 8/22* (2006.01)
    *C10G 49/22* (2006.01)
    *C10G 45/00* (2006.01)
    *C10G 47/00* (2006.01)
    *B01L 3/16* (2006.01)
    *C10G 47/06* (2006.01)
    *C10G 47/26* (2006.01)

(52) U.S. Cl.
    CPC ............ *C10G 47/00* (2013.01); *C10G 47/06* (2013.01); *C10G 47/26* (2013.01); *C10G 49/22* (2013.01); *B01J 2219/00006* (2013.01); *B01J 2219/00033* (2013.01); *B01J 2219/00105* (2013.01); *C10G 2300/1037* (2013.01); *C10G 2300/4006* (2013.01); *C10G 2300/4012* (2013.01); *C10G 2300/4081* (2013.01); *C10G 2400/28* (2013.01)

(56) References Cited

U.S. PATENT DOCUMENTS

| | | | |
|---|---|---|---|
| 3,377,267 A | 4/1968 | Spars | |
| 6,800,664 B1 * | 10/2004 | Espinoza | B01J 8/1809 |
| | | | 518/700 |
| 6,974,842 B1 * | 12/2005 | Spena | C10G 2/32 |
| | | | 518/700 |
| 2012/0109873 A1 | 5/2012 | Sardar et al. | |
| 2015/0176093 A1 * | 6/2015 | Powell | C10G 1/065 |
| | | | 127/1 |
| 2015/0213940 A1 | 7/2015 | Patron et al. | |
| 2015/0275108 A1 * | 10/2015 | Gueh | C10K 1/003 |
| | | | 252/373 |

OTHER PUBLICATIONS

International Preliminary Report on Patenability for PCT/IB2017/056646 dated Sep. 21, 2018, 14 pages.

* cited by examiner

Figure 5 ered to the reactor and a
APPARATUS AND PROCESS FOR THE HYDROCONVERSION OF HEAVY OIL PRODUCTS The present invention relates to an apparatus and a process for the hydroconversion of heavy oil products.

Said apparatus is applicable in all industrial contexts in which it is necessary to exploit heavy oil products, for example refineries.

In the present patent application, heavy oil products refer to crude oils, heavy crude oils, bitumens from bituminous sands, distillation residues, heavy distillation cuts, residues from deasphalting, synthetic oils, products from the Fischer Tropsch process, vegetable oils, oils from coke and oil shales, oils obtained by thermal decomposition of scraps, polymers, biomasses.

In the present patent application, slurry phase means a mixture of liquid and solid.

In the present patent application, two-phase fluid means a fluid that contains a vapor phase and a slurry phase.

In the present patent application, all the operating conditions included in the text must be considered as preferred conditions even if this is not specifically stated.

For the purpose of this text the terms "comprise" or "include" also comprise the terms "consist in" or "essentially consisting of".

For the purpose of this text the definitions of the intervals always comprise the extremes unless specified otherwise.

The hydroconversion of heavy oil products may be performed by adopting different process flow diagrams. The heart of the technology is the hydroconversion reactor which may be of the fixed bed, ebullated bed or slurry type. In a slurry reactor the catalyst is dispersed in the reaction means and uniformly distributed within the reactor itself.

A possible hydroconversion process configuration for heavy oil products consists of Eni Slurry Technology, property of Eni and known by the acronym EST. This configuration envisages a hydroconversion reactor, loaded with a molybdenum based catalyst of dimensions such as to be completely dispersed in the reaction means, so as to be able to operate in the slurry phase, producing a two-phase head effluent which is subsequently sent to a high pressure and high temperature (HP/HT) phase separator.

The vapor phase at the outlet of the HP/HT separator is sent to a section for the recovery, through condensation, of naphtha, atmospheric gas oil (AGO), vacuum gas oil (VGO) and a desulfurized hydrogen-rich stream, containing C1-C4 gas, which is recycled to the reactor apart from a part taken to prevent the accumulation of C1-C4 gases. The bottom stream at the outlet of the HP/HT separator is in the slurry phase in which the solid fraction also comprises the catalyst. This slurry stream is sent to a series of vessels at decreasing pressure and temperature—such as a medium pressure separator, an atmospheric column and a vacuum column—with the aim of separating the VGO from the heavier products. Of the latter—containing the unconverted load together with the catalyst and the solid formed during the reaction—one part generates the part recycled to the reactor and the rest is removed from the process as the drain stream.

The reaction products of an EST process may also be obtained exclusively in the vapor phase, as happens in the EST Vapor Phase Outflow (EST-VPO) process, described in various patent applications according to the progressive development of the technology. Below, the Applicant provides a summary of the patent applications that apply EST-VPO technology.

WO 2008/141830 describes a process for the hydroconversion of heavy oils in which the reaction takes place in a solid accumulation reactor of the bubble tower type, able to accumulate at least 50 kg/m$^3$, fed with hydrogen or a mixture of hydrogen and sulfuric acid in which the hydrogen has a ratio by weight, with respect to the load, of at least 0.3. The concentration of molybdenum used as a catalyst is at least 5 kg for every m$^3$ of reaction means.

WO 2008/141831 describes a system for the hydroconversion of heavy oils which consists of a solid accumulation reactor and a stripping section external or internal to the reactor. When the stripping section is internal, the reactor may be completely or partially filled and the stripping section may be positioned in the upper part of the reactor or downstream of a pipeline internal to the reactor. When the stripping section is external, the completely filled reactor provides a forced recirculation circuit of the liquid phase to the reactor itself. It is possible, furthermore, that downstream of the reactor there is a liquid-vapor separator.

WO 2016/103199 describes a system for the hydroconversion of heavy oils comprising a reactor, a liquid-vapor separator and a stripping section of the conversion products external to the reactor. The stripping gas is introduced directly into the reaction effluent through a stripping gas inflow pipeline, positioned in a point of the connecting pipeline between the reactor head and the liquid-vapor separator, said connecting pipeline being inclined, at least starting from the inflow point, upwards with a slope between 2% and 20%, with respect to a horizontal plane. The stripping gas inflow pipeline is inclined with respect to the axis of the connecting pipeline between the reactor head and the liquid-vapor separator by an angle comprised between 20° and 65°. The flow of the gaseous stripping stream that is introduced into the connecting pipeline between the reactor head and the separator has a downwards direction. After stripping, the effluent is sent to a HP/HT phase separator for separating the liquid phase containing a small quantity of solids (those formed during the reaction and the dispersed catalyst) which is recycled to the reactor and a vapor phase containing the reaction products.

Through the adoption of an EST-VPO process flow diagram it is possible to prevent the use of low pressure sections that could cause the formation of coke outside the reactor. However, this implies a reduction in plant capacity.

In the presence of a catalyst and in the absence of hydrogen, at lower pressures than the reactor pressure, it has been experimentally found that dehydrogenation reactions can take place that lead to the production of hydrogen and coke. High temperature, low pressure and high residence times in the liquid hold-ups of vessels can cause the formation of solids outside the reactor of the same order of magnitude as that in the reactor. Furthermore, if not envisaged during the design phase through suitable sizing of the vacuum unit, the formation of hydrogen in the bottom of the vacuum column can have a significant impact on the fractionation capacity of the column.

By adopting an EST-VPO process flow diagram according to which the reaction products are only obtained in vapor phase, after HP/HT separation, the slurry phase is confined to the H$_2$ partial high pressure zone, eliminating all the problems connected with dehydrogenation and the formation of solid product outside the reactor. However, in return for this advantage, the capacity of an EST-VPO plant with direct recycling from the HP/HT separator at the same reaction temperature is significantly lower than that of an EST plant with vacuum column recycling. The load loss can be compensated by increasing the reaction temperature, even if this implies an increase in the formation of solid in the reactor.

To solve these technical problems the Applicant has found that by substituting the HP/HT separator with an appropriate high pressure and high temperature stripping column it is possible to increase the conversion capacity of a hydroconversion plant of heavy oil products according to the EST-VPO configuration.

Therefore, the present patent application relates to an apparatus for the hydroconversion of heavy oil products which constitute the fresh load, said apparatus comprising:

a slurry bubble column hydroconversion reactor, which comprises a feed line in which the fresh load and the recirculated slurry phase are conveyed, an inlet line for a hydrogenating stream and an outlet for a reaction effluent;

a stripping column at high pressure and high temperature placed downstream of the reactor and directly connected to the reactor head through a pipeline in which the reaction effluent flows; said column having an inlet line for a stripping gas, an inlet for the reactor effluent, a column head outlet for steam and a column bottom outlet for the slurry phase;

lines and means for recirculating the slurry leaving the stripping column;

lines and means for taking a drain stream, which has the function of preventing the accumulation of solids in the reactor;

said stripping column characterized in that it contains one or more contact devices that allow physical contact to be created between different phases.

Therefore, the present patent application further relates to a process for the hydroconversion of heavy oil products, which constitute the fresh load, said process comprising the following steps:

reacting in at least one hydroconversion reactor a feed, which includes fresh feed and recirculated slurry, with a hydrogenating gas, in the presence of a suitable hydrogenation catalyst, thereby producing a two-phase effluent;

subsequently, sending directly said reaction effluent to a stripping step at high pressure and high temperature, which operates at the reaction pressure, except for load losses along the line in which the reaction effluent flows; feeding as a stripping gas a stream having the same composition as the gas fed to the reactor; and thus producing a stream in the vapor phase and a stream in the slurry phase containing the heavy components and the solid products;

continuously recirculating to the hydroconversion reactor the slurry separated in the stripping step, and continuously taking a drain stream.

The advantage of adopting an EST-VPO process flow diagram with the presence of a HP/HT stripper with respect to the traditional EST diagram consists of the removal of the low pressure sections otherwise necessary for recovering the reaction products, which work in the presence of a catalyst and in the absence of hydrogen, and which can lead to the formation of coke outside the reactor.

The low pressure sections are typically atmospheric and/or vacuum distillation columns or sequences of separators at different and decreasing pressures.

As discovered experimentally, in the low pressure sections, and particularly in the vacuum section, dehydrogenation reactions can take place that lead to the production of hydrogen and coke.

High temperature, low pressure and high residence times in the liquid hold-ups of vessels can cause the formation of solids outside the reactor of the same order of magnitude as that in the reactor. Furthermore, the formation of hydrogen in the bottom of the vacuum distillation column can have a significant impact on the fractionation capacity of the column.

By adopting an EST-VPO process flow diagram which allows the reaction products to be obtained in the vapor phase only, after separation in a HP/HT stripper, the slurry phase is confined to a $H_2$ partial high pressure zone, eliminating all the problems connected with dehydrogenation and the formation of solid product outside the reactor.

As will be demonstrated below, through the apparatus and process described and claimed, greater effectiveness is found through adopting a HP/HT stripper instead of a HP/HT separator, since the lighter products contained in the liquid fraction of the reaction effluent are stripped in the vapor phase from the stripping gas, creating a new liquid-vapor equilibrium that promotes the enrichment of the vapor phase in heavier products. By using a HP/HT separator, which works at approximately the temperature and pressure of the reaction column, there is separation between the liquid and the vapor phase only, with the same compositions at the L/V equilibrium of the stream leaving the reactor head.

Further objects and advantages of the present invention will become clearer from the following description and appended drawings, given by way of non-limiting illustration only.

In FIG. 3, (A) is a hydroconversion reactor, (S) is a zone where the liquid-vapor separation of the reaction effluent takes place, (E) is a stripping zone where the separated slurry phase (10) comes into contact with the stripping gas (6), generating the gaseous stream (11) rich in volatile components and the slurry stream (7) containing the extract. In FIG. 3, (1) is the fresh load of heavy oil products, (4) is the hydrogenating load—preferably containing a mixture of hydrogen, methane, ethane, propane and butane—, (9) is the vapor phase separated by the HP/HT separator, (8) is the vapor phase containing the reaction products obtained by joining the vapor streams (9) at the outlet from the separator (S) and (11) at the outlet from the stripping zone (E), (3) is the drain, (2) is the part of the slurry stream recycled to the reactor.

DETAILED DESCRIPTION

The present invention is now described in detail with reference to FIG. 1.

The fresh load, represented by the heavy oil products (1) and a hydrogenating stream (4) are fed through two separate inlets to a slurry bubble hydroconversion reactor (A).

The hydrogenating stream may preferably be hydrogen, or a mixture of hydrogen and light hydrocarbons in the gas phase; more preferably a mixture of hydrogen, methane, ethane, propane and butane. The two-phase reaction effluent (5) is sent directly to a high pressure and high temperature stripping column (B), positioned downstream of the reactor and directly connected to the reactor head through a pipeline in which said effluent flows.

Along said pipeline there are no liquid-vapor or liquid-vapor-solid separation devices.

The pipeline that connects the reaction head to the stripping column is composed of a vertical portion, connected to the outlet positioned on the reactor head, and a portion that is connected to an inlet to the stripping column.

The portion that is connected to the inlet to the stripping column is inclined downwards with an inclination comprised between 2% and 10%, preferably between 4% and 7%, calculated with respect to the horizontal plane orthogonal to the axis of the reactor and to the axis of the stripping column.

The inclined portion of the pipeline may be designed so that the ratio between the length of the inclined portion and the inner diameter of the pipeline is at least equal to 20. This ratio ensures the establishment of a stationary flow regime within the pipeline.

The inclination of the pipeline ensures the establishment of stratified motion wherein the slurry phase flows in the lower part of the pipe without creating wave motion, as would occur instead for a pipeline inclined upwards such as that described in WO 2016/103199. In the embodiment of the pipeline described in WO 2016/103199, the wave motion was necessary in order to ensure the stripping effect of the secondary gas introduced into the line. In this way, the possibility of reaching a new liquid-vapor equilibrium is guaranteed. In the present invention, in said pipeline, extremely regular motion is to be created so that the separation between the phases is already performed before the inlet to the stripping column, also minimizing the flow rates entering the column. With the same effluent flow rates from the reactor, the downwards inclination reduces the hold-up of slurry in the line and significantly increases its speed, with respect to the case of a line inclined upwards. Furthermore, the line inclined downwards also reduces or eliminates any problems of sedimentation of the solids transported by the slurry.

Except for any losses of load along the line in which the reaction effluent flows, the stripping column operates at the reactor pressure.

The hydrogenation catalyst in slurry phase may preferably be based on molybdenum or tungsten sulfide.

The hydroconversion reaction is preferably conducted at a temperature comprised between 400° C. and 450° C. and at a pressure comprised between 100 atm and 200 atm. More preferably, the hydroconversion reaction is preferably conducted at a temperature comprised between 420° C. and 440° C. and at a pressure comprised between 140 atm and 180 atm.

The high pressure and high temperature stripping is preferably conducted under the same pressure conditions as the reactor, except for any load losses.

A stripping gas (6) is fed to the stripping column through an inlet line positioned above the level of the liquid accumulated in the column. The stripping gas is a stream having the same composition as the hydrogenating gas stream fed during the reaction. The stripping gas flows towards the head of the column meeting the liquid component of the reaction effluent which, on the contrary, flows towards the bottom of the column. The vapors already present in the reaction effluent, the volatile components stripped from the liquid present in the reaction effluent and the stripping gas accumulate in the stripping column head, thus forming a stream of light products leaving the column head.

In the stripping column there are one or more contact devices that allow physical contact to be created between different phases. In these contact devices, the stripping gas is in contact with the liquid phase of the reaction effluent from which it is able to separate the light components from the heavy ones.

As mentioned, the stripping column contains one or more contact devices, preferably from 2 to 6, which may be of different types, considering that the aim to be reached is to create effective contact between the stripping gas that climbs the column and the liquid that also drags with it the solid particles. To prevent any dirtying phenomena, it is preferable to use contact devices selected from shed decks, disk and donut trays and side to side trays.

There are different configurations of contact devices, the aim of which is to create at least one theoretical equilibrium stage. By increasing the number of contact devices beyond a certain value, the stripping efficacy is reduced until a plateau is reached. The best configuration identified envisages the use of at least one equilibrium stage to enrich the vapor phase of the heavier compounds compatibly with the quality of the products obtained.

The liquid stream (7) containing the less volatile components and leaving the stripping column is recirculated to the hydroconversion reactor, through an appropriate pipeline, after taking a drain stream (3).

Such recirculation can take place in a natural way, by exploiting the difference in density between the streams, or in a forced way through the use of an appropriate pump adapted for the treatment of liquid-solid mixtures.

The drain has a fundamental function, since it prevents the accumulation of solids in the hydroconversion reactor.

In patent applications US 2015/0210940 and WO 2008/141830, on the contrary, a solid accumulation reactor is described wherein the solids generated or derived from the load are accumulated to a very high level. In the solid accumulation reactor it is fundamental to keep the solid constantly in the reactor as in this way it is possible to prevent the deactivation of the catalyst, thermal dehydrogenation and the formation of coke.

On the contrary, the hydroconversion reactor of the apparatus described and claimed in the present patent application must never be a solid accumulation reactor and therefore inside it, and precisely on the bottom, no solid phase must accumulate. To do this, it is necessary to take a drain stream continuously either from the recycle stream to the reactor or directly from the reactor. In the former case, taking lines and means are located on the recirculation line, whereas in the latter case said lines and means are connected directly to the hydroconversion reactor.

The drain flow rate, when taken from the recycle stream, can be modulated so as to have a percentage by weight of tetrahydrofuran-insoluble solids (said insoluble solids are indicated as THF-i) in the recycle stream and in the drain stream that ranges from 3% to 15%, preferably from 6% to 12%.

Preferably, the process described and claimed is conducted using the hydroconversion apparatus according to the present patent application.

The main hydroconversion products are $H_2S$, $NH_3$, methane, ethane, propane, butane, naphtha, atmospheric gas oil and vacuum gas oil. The hydroconversion is accompanied by the demetallation of the load: vanadium, nickel and iron sulfides are added as solids in the slurry phase to the molybdenum sulfide which is the process catalyst. A lower formation with respect to the main products of a solid carbon mesophase is also observed, which constitutes most of the tetrahydrofuran-insoluble solids, THF-i, contained in the stream at the outlet from the reactor.

Subsequently, said stream is sent to a stripper in which a vapor phase leaves the head and a slurry stream with heavy less volatile components leaves the bottom, which is recycled to the hydroconversion reactor (2) except for a drain stream (3). Such recycling is performed through natural recirculation or through the use of a pump, as highlighted in FIG. 1. The recycled slurry is joined with the fresh load and introduced into the hydroconversion reactor.

A hydroconversion process flow diagram and, in particular an EST-VPO process flow diagram that uses a high pressure and high temperature (HP/HT) separator, which operates at the same operating conditions as the plant described and claimed in the present patent application, has a lower production capacity. This is due to the fact that the liquid phase separated in the HP/HT separator and recycled to the reactor has the same composition as the liquid component of the effluent leaving the reactor.

By replacing the HP/HT separator on the reaction effluent line with a high pressure and high temperature stripping column, and using as a stripping gas a stream with a composition equal to that of the gas fed to the reactor, the vapor component—which contains the reaction products in equilibrium with the liquid component of the reaction effluent —, is immediately removed leaving the contact column head and joining with the stripping gas which drags with it the lighter components of the liquid phase of the reaction effluent and rising along said column. The stripping gas, meeting the slurry stream which descends along the contact device of the stripping column, shifts the equilibrium reached at the reactor outlet. From the liquid component the stripping gas is able to drag the higher boiling point components which, without its use, would remain trapped in the liquid phase at the reactor outlet. The new liquid phase leaving the stripping column, having had its lighter components removed, is then recirculated except for a small drain portion—naturally or using a suitable taking device—to the hydroconversion reactor. The vapor phase leaving the stripping column contains heavier components than those removed with the vapor phase at the outlet from the reactor. All this causes an increase in the plant's production capacity and therefore a higher quantity of processable fresh load. It is clear that the more similar the liquid recycled to the reactor is, in terms of its composition, to the liquid leaving the reactor, the more there will be a shift towards light products. With respect to an EST-VPO process flow diagram, due to the stripping action of the gas, the liquid recycled to the reactor will have a different composition and will be heavier than that leaving the reactor itself. Therefore, the quantity of products obtained overall in the vapor phase will be higher even if their composition will be different.

For the purpose of understanding the present invention better and to put it into practice, below are some illustrative and non-limiting examples thereof.

Comparative Example 1

Figure 2:
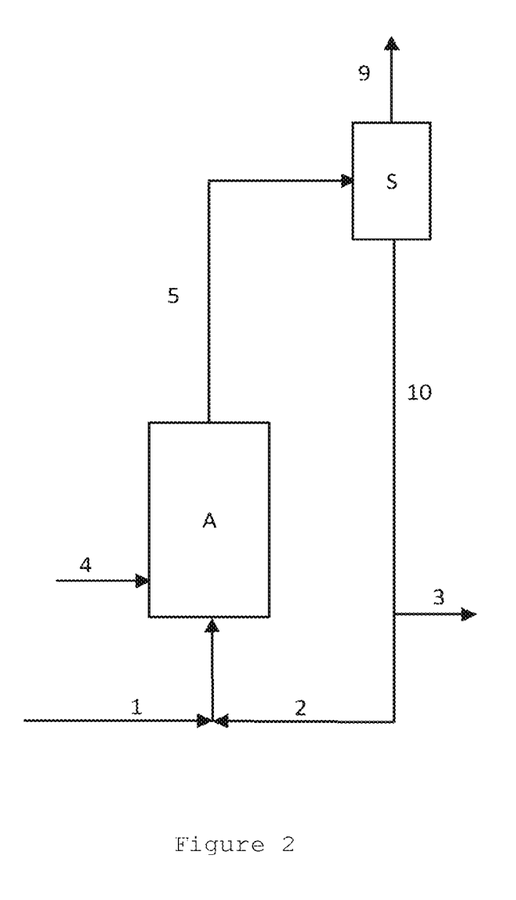
FIG. 2 illustrates a simulation model of the hydroconversion apparatus according to the state of the art, wherein (A) is a hydroconversion reactor, (S) is a separator, (1) is the fresh load of heavy oil products, (4) is the hydrogenating stream—preferably containing a mixture of hydrogen, methane, ethane, propane and butane—, (5) is the two-phase reaction effluent, (10) is the separated slurry phase, (9) is the separated vapor phase, (3) is the drain, (2) is the part of the slurry phase recycled to the reactor.

With reference to FIG. 2, consider a hydroconversion slurry plant with a VPO arrangement, comprising a bubble column slurry reactor with industrial dimensions (45 m height, 4.8 m inner diameter) connected, through the line (5), to a separator, whose vapor (9) contains the hydroconversion products and whose slurry (10) is recycled to the reactor through the relevant line (2), subject to the taking on the recirculation line of a drain stream (3).

The reactor, which operates at a temperature of 435° C. and at a pressure of 160 bar, is fed through the line (1) with a vacuum residue characterized by the following composition:

350-450° C. cut: 3.6% by weight
450-500° C. cut: 4.5% by weight
500-540° C. cut: 11.0% by weight
540° C.+residue: 80.9% by weight The drain flow rate is selected so as to have a percentage by weight of tetrahydrofuran-insoluble solids, THF-i, in the recycle stream and in the drain, of 10% by weight.

The recirculation flow rate is set to 100 t/h, a circulation that may be natural due to the difference in density between the mixed phase of the reactor and the slurry of the line descending from the separator (10), or forced through a pump.

The flow rate of gas fed to the reactor through the line (4) contains 88.6% in moles of $H_2$, the rest being prevalently constituted by methane, ethane, propane, butane and in this example equal to 20 t/h.

In this layout, which constitutes the basic reference case, the flow rate of vacuum residue fed is equal to 58.5 t/h. This value is calculated through a process simulation developed from a thermodynamic, fluid dynamic and kinetic point of view using the data from an industrial hydroconversion plant with a slurry bubble reactor.

The hydroconversion products are distributed, at the outlet from the plant, as reported in

TABLE 1

| | |
|---|---|
| $H_2S$ | 2.8 wt % |
| $NH_3$ | 0.3 wt % |
| C1-C4 | 10.2 wt % |
| C5-170° C. | 16.4 wt % |
| 170-350° C. | 41.4 wt % |
| 350-450° C. | 15.7 wt % |
| 450-500° C. | 4.6 wt % |
| 500° + C. | 0.9 wt % |
| drain | 7.7 wt % |

Example 1

Figure 1:
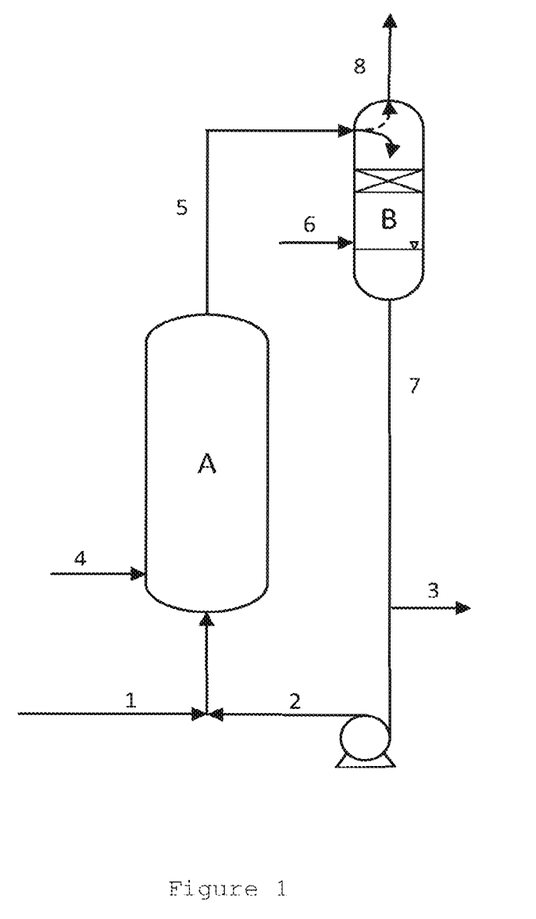
FIG. 1 illustrates a preferred embodiment of the hydroconversion apparatus described and claimed, wherein (A) is a hydroconversion reactor, (B) is a stripping column, (4) is a hydrogenating stream—preferably containing a mixture of hydrogen, methane, ethane, propane and butane—, (1) is the fresh load of heavy oil products, (5) is the two-phase reaction effluent, (6) is the stripping gas, (8) is a stream in the vapor phase containing the light hydroconversion products, (7) is a stream in slurry phase containing the heavy products and solids, (3) is a drain stream, (2) is the part recycled to the reactor.

Maintaining unaltered, with respect to comparative example 1, the geometry of the reactor, the operating conditions and the composition of the vacuum residue fed and replacing, in accordance with the present invention, the separator with a stripper (B) as in FIG. 1, the vacuum residue flow rate increases to 76 t/h. The stripper is fed with a flow rate of 20 t/h of stripping gas, line (6), having the same temperature and composition as the gas fed to the reactor. The stripper is simulated as a liquid-vapor equilibrium stage in which the streams entering are the slurry coming from the reactor and the stripping gas. The streams leaving this equilibrium stage are a more concentrated slurry to be recycled to the reactor and a gas containing the stripped products which is joined with the vapor coming from the reactor to constitute the vapor leaving the stripper, meaning the vessel, through the line (8). The liquid-vapor equilibrium calculations are performed, as for the reactor, with the RKS equation of state.

The use of the stripper instead of the separator allows the capacity of the hydroconversion plant to be increased by 30%, meaning the vacuum residue feed flow rate.

The hydroconversion products of the vacuum residue are subdivided as shown in Table 2.

TABLE 2

|  | Comparative Example 1 | Example 1 |
|---|---|---|
| $H_2S$ | 2.8 wt % | 2.8 wt % |
| $NH_3$ | 0.3 wt % | 0.3 wt % |
| C1-C4 | 10.2 wt % | 9.8 wt % |
| C5-170° C. | 16.4 wt % | 14.7 wt % |
| 170-350° C. | 41.4 wt % | 37.2 wt % |
| 350-450° C. | 15.7 wt % | 19.9 wt % |
| 450-500° C. | 4.6 wt % | 7.6 wt % |
| 500° + C. | 0.9 wt % | 1.6 wt % |
| drain | 7.7 wt % | 6.1 wt % |

The slightly heavier nature of the products is compensated by the significant increase in capacity.

Example 2

The increase in capacity resulting from the use of the stripper (instead of a simple separator) depends on the ratio between the hydrogenating gas feed flow rate to the reactor and the stripping gas feed flow rate to the stripper.

Figure 5:
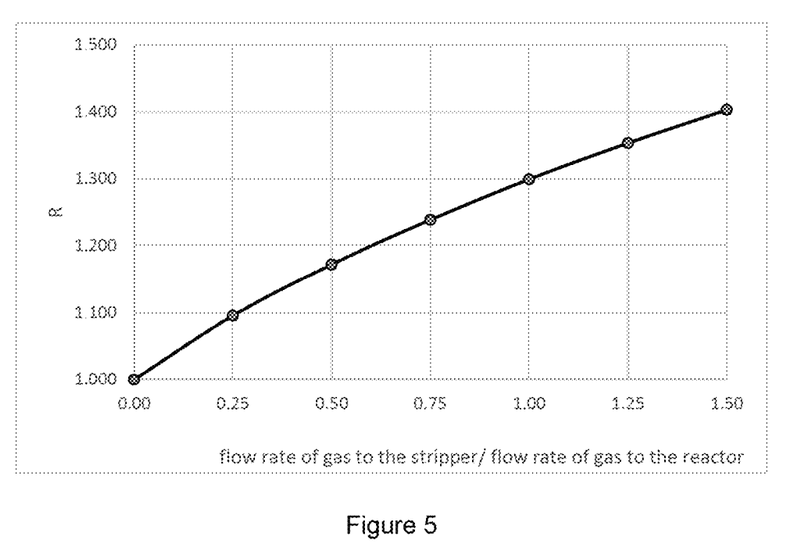
FIG. 5 is a graph showing the flow rate of stripping gas as a function of the flow rate of gas to the reactor.

Maintaining unaltered, with respect to example 1, the geometry of the reactor, the operating conditions and the vacuum residue fed, and acting on the ratio between the flow rate of stripping gas to the stripping column and the hydrogenating one to the reactor, set to 20 t/h, the graph of FIG. 5 is obtained, wherein R is the ratio between the capacity of the hydroconversion plant with the stripper and that of the hydroconversion plant with the separator.

From FIG. 5 it can be seen that as the flow rate of stripping gas to the stripper increases, the flow rate of processed load from the plant increases; already with 5 t/h of stripping gas (abscissa equal to 0.25) a 10% increase in the flow rate of processed load is obtained (ordered from 1 to 1.1). The effect of the increase in stripping gas is not linear and tends to diminish: at 20 t/h of stripping gas (abscissa=1) to increase the load flow rate by the same amount (ordered from 1.3 to 1.4) twice the amount of gas is required: 10 t/h.

Example 3

The plates positioned inside the stripper between the slurry feed and the stripping gas feed must perform at least one theoretical equilibrium stage: this is the assumption made in examples 1 and 2. The advantage of using a plate stripper lies in the possibility of creating more than one theoretical equilibrium stage, unlike a traditional stripper in which the stripping gas is made to bubble directly in the slurry. In this example there is the advantage that can be obtained in terms of plant capacity by performing, with an appropriate increase in the number of real plates, two theoretical equilibrium stages. Maintaining the geometry of the reactor, the operating conditions and the composition of the vacuum residue fed unaltered, with respect to comparative example 1, using a stripping gas at the same temperature as the reactor, the use of an equivalent stripper to a theoretical equilibrium stage makes the flow rate of the vacuum residue increase from 58.5 t/h to 72.8 t/h; if the real plates contained in the stripper create two theoretical equilibrium stages the flow rate of vacuum residue rises further to 74.7 t/h.

Example 4

To illustrate the effect of the invention proposed in this example better, the flow rates and compositions are compared in different points of the process flow diagram.

The block diagram of FIG. 2 relates to comparative example 1.

As can be seen in Table 3, the stream recirculated to the reactor (2) has the same composition as the slurry stream (10) separated from the reaction effluent in the separator (S).

Figure 3:
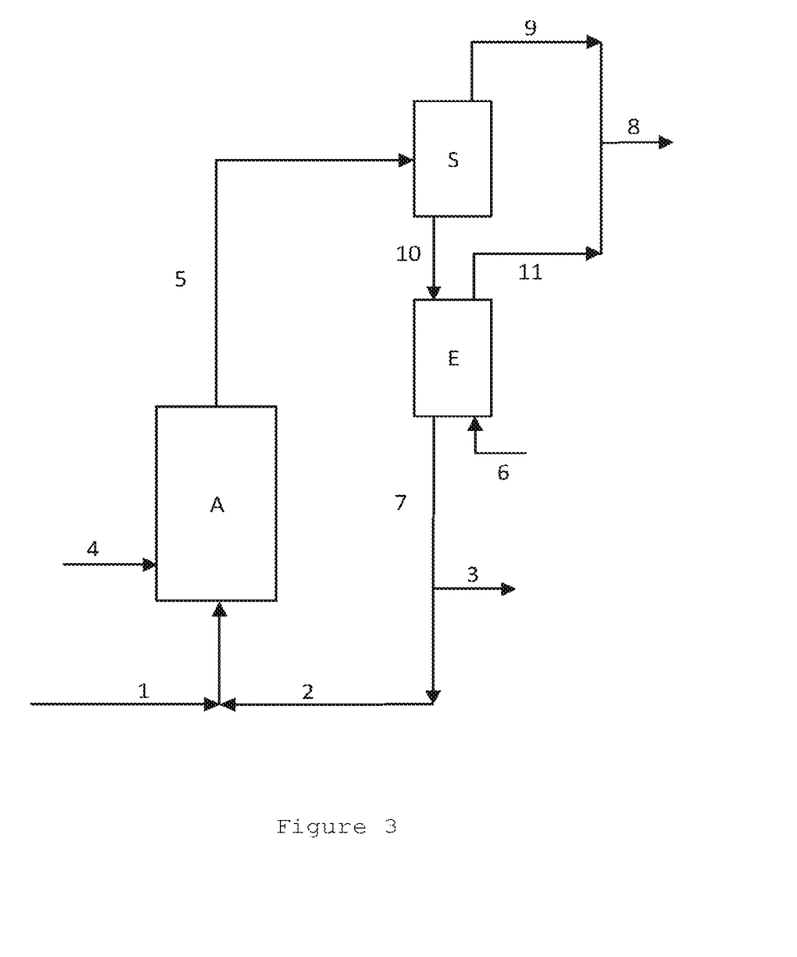
FIG. 3 reproduces a simulation model of the hydroconversion apparatus in accordance with FIG. 1 wherein the stripping column is portrayed through a separation zone (S) and a stripping zone (E).

FIG. 3, on the other hand, reproduces FIG. 1 with a block diagram and refers to example 1.

In this case the stripping column is portrayed through a separation zone (S) and a stripping zone (E) that are not obviously physically separate, but that are simulated separately for modelling what would happen in reality.

In the stripping zone (E) the liquid-vapor equilibrium is created between the stream (10) and the stream (6) of stripping gas, generating the gas stream (11) enriched with stripped products and the stream (7) that is split into the slurry stream (2) recycled to the reactor and into the drain slurry stream (3).

As can be seen in Tables 4 and 5, in this case the stream (2) recycled to the reactor does not have, unlike the one shown in Table 3, the same composition as the stream (10): the percentage of 450– cuts is reduced and that of 450+ cuts of tetrahydrofuran-insoluble solids increases.

TABLE 3

|  |  | 1 | 2 | 4 | 10 | 9 | 3 |
|---|---|---|---|---|---|---|---|
| T | ° C. | 205 | 420 | 507 | 435 | 435 | 420 |
| P | bar | 163 | 163 | 162 | 157 | 157 | 159 |
| W | t/h | 58.5 | 90.0 | 20.0 | 93.6 | 74.5 | 3.6 |
| Ws | t/h | 0.0 | 10.0 |  | 10.4 |  | 0.4 |
| $H_2$ | wt % | 0.0 | 0.2 | 34.1 | 0.2 | 6.9 | 0.2 |
| $NH_3$ | wt % | 0.0 | 0.0 | 0.0 | 0.0 | 0.2 | 0.0 |
| $H_2S$ | wt % | 0.0 | 0.1 | 0.0 | 0.1 | 2.3 | 0.1 |
| $CH_4$ | wt % | 0.0 | 0.3 | 25.2 | 0.3 | 8.4 | 0.3 |
| C2 | wt % | 0.0 | 0.3 | 18.3 | 0.3 | 6.9 | 0.3 |
| C3 | wt % | 0.0 | 0.3 | 11.8 | 0.3 | 5.4 | 0.3 |
| C4 | wt % | 0.0 | 0.3 | 6.6 | 0.3 | 4.3 | 0.3 |
| C5-170 | wt % | 0.0 | 1.5 | 4.0 | 1.5 | 14.4 | 1.5 |
| 170-350 | wt % | 0.1 | 15.3 | 0.0 | 15.3 | 33.5 | 15.3 |
| 350-450 | wt % | 3.6 | 23.6 | 0.0 | 23.6 | 12.8 | 23.6 |
| 450-500 | wt % | 4.5 | 16.8 | 0.0 | 16.8 | 3.8 | 16.8 |
| 500-540 | wt % | 11.0 | 6.2 | 0.0 | 6.2 | 0.7 | 6.2 |
| 540+ | wt % | 80.8 | 25.1 | 0.0 | 25.1 | 0.4 | 25.1 |
| THF-i | wt % | 0.0 | 10.0 | 0.0 | 10.0 | 0.0 | 10.0 |

TABLE 4

|  |  | 1 | 2 | 4 | 10 | 9 | 3 |
|---|---|---|---|---|---|---|---|
| T | ° C. | 238 | 432 | 501 | 435 | 435 | 432 |
| P | bar | 163 | 163 | 164 | 159 | 159 | 159 |
| W | t/h | 76.0 | 90.0 | 20.0 | 119.2 | 66.4 | 4.2 |
| Ws | t/h | 0.0 | 10.0 |  | 10.5 |  | 0.5 |
| $H_2$ | wt % | 0.0 | 0.2 | 33.7 | 0.2 | 7.1 | 0.2 |
| $NH_3$ | wt % | 0.0 | 0.0 | 0.0 | 0.0 | 0.3 | 0.0 |
| $H_2S$ | wt % | 0.0 | 0.0 | 0.0 | 0.1 | 3.0 | 0.0 |
| $CH_4$ | wt % | 0.0 | 0.2 | 24.3 | 0.3 | 9.2 | 0.2 |
| C2 | wt % | 0.0 | 0.2 | 18.6 | 0.3 | 7.9 | 0.2 |
| C3 | wt % | 0.0 | 0.1 | 12.3 | 0.3 | 6.4 | 0.1 |
| C4 | wt % | 0.0 | 0.1 | 7.0 | 0.3 | 5.1 | 0.1 |
| C5-170 | wt % | 0.0 | 0.3 | 4.1 | 1.6 | 15.8 | 0.3 |
| 170-350 | wt % | 0.1 | 5.1 | 0.0 | 12.0 | 28.2 | 5.1 |
| 350-450 | wt % | 3.6 | 18.1 | 0.0 | 20.6 | 11.6 | 18.1 |
| 450-500 | wt % | 4.5 | 19.3 | 0.0 | 18.0 | 4.1 | 19.3 |
| 500-540 | wt % | 11.0 | 8.7 | 0.0 | 7.5 | 0.8 | 8.7 |
| 540+ | wt % | 80.8 | 37.7 | 0.0 | 30.7 | 0.5 | 37.7 |
| THF-i | wt % | 0.0 | 10.0 | 0.0 | 8.1 | 0.0 | 10.0 |

TABLE 5

|  |  | 6 | 11 | 7 | 8 |
|---|---|---|---|---|---|
| T | ° C. | 501 | 447 | 447 | 440 |
| P | bar | 159 | 159 | 159 | 159 |
| W | t/h | 20.0 | 45.0 | 94.2 | 111.3 |
| Ws | t/h |  |  | 10.5 |  |
| $H_2$ | wt % | 33.7 | 15.1 | 0.2 | 10.3 |
| $NH_3$ | wt % | 0.0 | 0.0 | 0.0 | 0.2 |
| $H_2S$ | wt % | 0.0 | 0.4 | 0.0 | 1.9 |
| $CH_4$ | wt % | 24.3 | 11.3 | 0.2 | 10.0 |
| C2 | wt % | 18.6 | 8.8 | 0.2 | 8.3 |
| C3 | wt % | 12.3 | 6.1 | 0.1 | 6.3 |
| C4 | wt % | 7.0 | 3.8 | 0.1 | 4.5 |
| C5-170 | wt % | 4.1 | 5.7 | 0.3 | 11.7 |
| 170-350 | wt % | 0.0 | 22.5 | 5.1 | 26.0 |
| 350-450 | wt % | 0.0 | 17.1 | 18.1 | 13.8 |
| 450-500 | wt % | 0.0 | 7.0 | 19.3 | 5.3 |
| 500-540 | wt % | 0.0 | 1.4 | 8.7 | 1.1 |
| 540+ | wt % | 0.0 | 0.8 | 37.7 | 0.6 |
| THF-i | wt % | 0.0 | 0.0 | 10.0 | 0.0 |

Example 5

Figure 4:
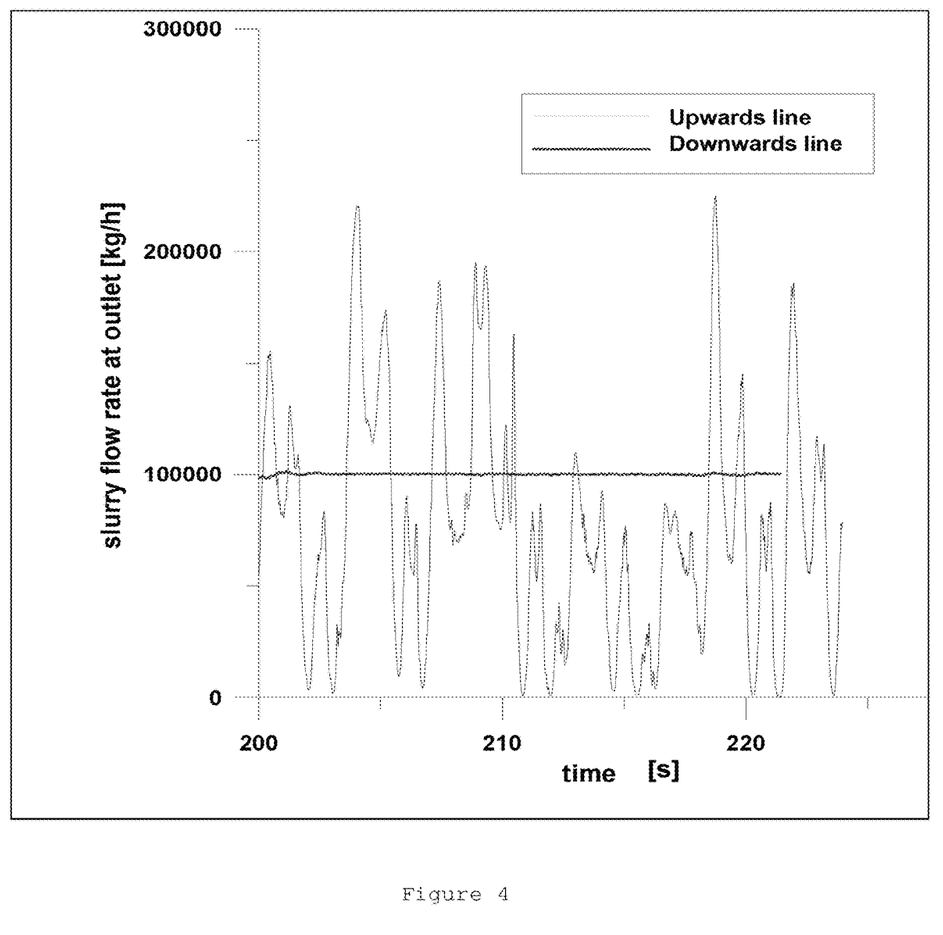
FIG. 4 is a graph showing the flow rate of slurry as a function of time.

The connecting pipeline between the reactor and the stripping column, after a vertical portion connected to the outlet nozzle of the reactor, must proceed downwards towards the column to ensure the establishment of a stratified mode and non-pulsating flows of gas and slurry at the inlet to the column. For this purpose, the results of CFD (Computational Fluid Dynamics) simulations of the motion of the connecting pipeline are presented herein in the "upwards" case, described in the state of the art and in the "downwards" case described and claimed in the present patent application. In the CFD simulations the reaction effluent has been described as a two-phase fluid, constituting a gas phase and a slurry phase. Therefore in the present example reference is always made to a two-phase fluid. The two-phase (gas-slurry) motion in the same pipeline is simulated through CFD, in one case, with a feed from the lower end with the fluid that therefore flows "upwards"; in the other, with a feed from the upper end, with the fluid that therefore flows "downwards"; with the same gas and slurry flow rates. The graph, FIG. 4, shows the flow rate of slurry at the outlet of the pipeline i.e. at the inlet of the column, respectively in the two cases, as a function of the time. It can be observed how in the "downwards" case the flow rate is approximately constant while in the "upwards" case, considerable flow rate oscillations are observed: from zero to twice the average flow rate.

The invention claimed is:

1. Apparatus for the hydroconversion of heavy oil products which constitute the fresh load, said apparatus comprising:
   a slurry bubble column hydroconversion reactor, which comprises a feed line in which the fresh load and the recirculated slurry phase are conveyed, an inlet line for a hydrogenating stream and an outlet for a reaction effluent through an outlet nozzle;
   a high pressure and high temperature stripping column placed downstream of the reactor and directly connected to the reactor head through a pipeline in which the reaction effluent flows; said column having an inlet line for a stripping gas, an inlet for the reactor effluent, a head outlet for steam and an outlet for the slurry phase;
   lines and means for recirculating the slurry leaving the stripping column;
   lines and means for taking a drain stream, which has the function of preventing the accumulation of solids in the reactor,
   said stripping column characterized in that it contains one or more contact devices that allow physical contact to be created between different phases; and wherein the pipeline connecting the reactor head to the stripping column is composed of a vertical portion, connected to the outlet placed on the reactor head, followed by a pipeline portion which is connected with an inlet to the stripping column, said portion being inclined downwards with an inclination comprised between 2% and 10%, calculated with respect to the horizontal plane orthogonal to the reactor axis and the stripping column axis.

2. Apparatus according to claim 1 wherein the stripping column contains from 2 to 6 contact devices.

3. Apparatus according to claim 1 or 2 wherein the contact devices are selected from shed decks, disk and donut trays, side to side trays.

4. Apparatus according to any one of claims 1 or 2 wherein the inclination is comprised between 4% and 7% calculated with respect to the horizontal plane orthogonal to the reactor axis and the stripping column axis.

5. Apparatus according to claim 1 or 2 wherein the inclined portion of the pipeline is designed so that the ratio between the length of the inclined portion and the inner diameter of the conduct is at least equal to 20.

6. Apparatus according to claim 1 or 2 in which the line and means for drain taking are or on the reactor recycle line or directly connected to the reactor.

7. A process for the hydroconversion of heavy oil products, which constitute the fresh load, which is carried out using the apparatus according to claim 1 or 2, said process comprising the following steps:
   reacting in the least one hydroconversion reactor a feed, which includes fresh feed and recirculated slurry, with a hydrogenating gas, in the presence of a suitable hydrogenation catalyst, thereby producing a two-phase effluent;
   subsequently, sending directly said reaction effluent to a high pressure and high temperature stripping step, which operates at the reaction pressure, except for load losses along the line in which the reaction effluent flows, feeding as a stripping gas a stream having the same composition as the gas fed to the reactor, and thus producing a stream in vapor phase and a stream in slurry phase containing the heavy products and the solids;

recirculating in feeding to the hydroconversion reactor, in a continuous manner, the slurry separated in the stripping step, and continuously taking a drain stream.

8. Process according to claim 7, wherein the hydrogenating gas is hydrogen or a mixture of hydrogen and light hydrocarbons in the gas phase.

9. Process according to claim 8 wherein the hydrogenating stream is a mixture of hydrogen, methane, ethane, propane and butane.

10. Process according to claim 7 wherein the hydrogenation catalyst in slurry phase is based on molybdenum or tungsten sulphide.

11. Process according to claim 7, wherein the hydroconversion reaction is conducted at a temperature comprises between 400° C. and 450° C. and at a pressure comprises between 100 atm and 200 atm.

12. Process according to claim 11, wherein the hydroconversion reaction is conducted at a temperature comprised between 420° C. and 440° C. and at a pressure comprised between 140 atm and 180 atm.

13. Process according to claim 7 wherein the stripping step is conducted at the same pressure as the reaction phase, except for load losses along the stripper feed line.

14. Process according to claim 7 wherein the drain is taken on the recycle line to the reactor or directly from the reactor.

15. Process according to claim 14 wherein the drain flow, when taken from the recycle stream, is modulated so as to have a weight percentage of tetrahydrofuran-insoluble solids in the recycle stream and the drain ranging from 3% to 15%.

16. Apparatus according to claim 3 wherein the inclination is comprised between 4% and 7% calculated with respect to the horizontal plane orthogonal to the reactor axis and the stripping column axis.

17. Apparatus according to claim 3 wherein the inclined portion of the pipeline is designed so that the ratio between the length of the inclined portion and the inner diameter of the conduct is at least equal to 20.

18. Apparatus according to claim 4 wherein the inclined portion of the pipeline is designed so that the ratio between the length of the inclined portion and the inner diameter of the conduct is at least equal to 20.

19. Apparatus according to claim 3 in which the line and means for drain taking are or on the reactor recycle line or directly connected to the reactor.

20. Process according to claim 8 or 9 wherein the hydrogenation catalyst in slurry phase is based on molybdenum or tungsten sulphide.

* * * * *